United States Patent [19]
Zarb

[11] Patent Number: 5,007,569
[45] Date of Patent: Apr. 16, 1991

[54] BACKSEAT STORAGE CONTAINER APPARATUS

[76] Inventor: Constance K. Zarb, 4097 Hardwoods, West Bloomfield, Mich. 48033

[21] Appl. No.: 472,848

[22] Filed: Jan. 31, 1990

[51] Int. Cl.$^5$ .............................................. B60R 7/04
[52] U.S. Cl. .................................. 224/275; 224/42.42; 224/901; 312/287; 312/235.8; 312/DIG. 33; 220/505; 220/532; 446/75; D3/40; D6/440
[58] Field of Search ................... 224/273, 275, 42.42, 224/901; 312/287, 283, 235.8, 235.6, DIG. 33; 297/194; 206/315.1, 457; 220/22, 22.3, 23, 83, 334; D3/40; D21/114; D6/397, 432, 434, 440, 442, 443, 445, 446, 448; 5/118; 108/44; 446/73, 75

[56] References Cited

U.S. PATENT DOCUMENTS

| | | | |
|---|---|---|---|
| D. 307,986 | 5/1990 | Falk | D6/440 |
| D. 310,395 | 9/1990 | Maloney | D21/114 |
| 2,629,644 | 2/1953 | Heys | 312/287 X |
| 2,678,682 | 5/1954 | Thomas | 224/275 X |
| 3,409,193 | 11/1968 | Metcalf | 224/273 |
| 3,873,010 | 3/1975 | Patterson | 224/275 |
| 3,909,092 | 9/1975 | Kiernan | 224/275 X |
| 3,926,473 | 12/1975 | Hogan | 312/235.6 X |
| 4,146,159 | 3/1979 | Hemmen | 224/275 |
| 4,146,279 | 3/1979 | Stahel | 312/235.8 |
| 4,300,709 | 11/1981 | Page, Jr. | 224/275 |
| 4,499,998 | 2/1985 | Carlson | 220/22.3 |
| 4,640,392 | 2/1987 | Decker, Jr. et al. | 220/23.83 X |
| 4,844,305 | 7/1989 | McKneely | 224/42.42 |
| 4,936,624 | 6/1990 | West | 312/DIG. 33 X |
| 4,964,249 | 10/1990 | Payne | 446/75 X |

FOREIGN PATENT DOCUMENTS

| | | | |
|---|---|---|---|
| 0700976 | 12/1964 | Canada | 446/75 |
| 0764061 | 12/1956 | United Kingdom | 312/DIG. 33 |
| 2124189 | 2/1984 | United Kingdom | 224/275 |

Primary Examiner—Henry J. Recla
Assistant Examiner—Casey Jacyna
Attorney, Agent, or Firm—Harness, Dickey & Pierce

[57] ABSTRACT

A hand-portable storage container with two headrest cushions designed for use by one or two children in the backseat of an automobile or other vehicle. The preferred overall configuration of the apparatus resembles a child's play house with a two-sided inclined roof structure, to which is attached two large pillows, one on each side. The left and right sections of the roof structure are preferably hinged. This gives the children access to internal storage compartments underneath the left and right sections of the roof structure, where the children may place toys, books, crayons or other supplies to keep them occupied on longer trips in the car. The storage compartments preferably include removable dividers with pockets or pouches for storing pencils or other small objects. The pillows are headrest cushions upon which the children may comfortably nap simultaneously, even while each is safely restrained by a seat belt in the backseat of a vehicle. The headrest cushions are preferably detachable for easy cleaning.

29 Claims, 2 Drawing Sheets

BACKSEAT STORAGE CONTAINER APPARATUS

BACKGROUND OF THE INVENTION

1. Field of the Invention

The present invention relates in general to portable storage containers designed for use by children in the passenger compartment of automotive vehicles and in particular to a portable backseat storage container apparatus having inclined headrest cushions for simultaneous use by two children.

2. Description of Related Art

For many years parents have attempted to deal with the problems often encountered with children on both short and long trips in the family automobile. As is well known, during such trips children often become bored or sleepy, or both. To combat boredom and to keep the children quietly occupied while in the backseat, parents often provide the children with toys coloring books, reading materials or a combination of the foregoing items. This, in turn, presents problems of how to conveniently assemble and store such items in preparation for a car trip and during the trip.

One problem experienced when items are stored on a seat or rear window ledge of a car is that they tend to move or fall when the car drives over bumps or is turning. Items such as crayons, books and games can thus end up underfoot on the floor of the car. The problem of items sliding is particularly acute when items that have flat, slippery surfaces, such as games in cardboard boxes or books, are stacked on the car seat or window ledge.

Many children fall asleep during long car trips, at least for a while. This can prove uncomfortable for the child, particularly when he or she does not have a cushion or pillow to lean his or her head against. The common solution to this problem is to provide the child with a pillow, cushion or a folded-up blanket so that the child will have a pillow against which he can place his head. The pillows and blankets, like the other items, present a storage problem. Often, they are propped up by the child against a door, and tend to fall out when the door is opened. Also, the pillows and blankets tend to end up on the floor of the backseat area. This is a problem during rainy or snowy weather, since the floor area or the child's shoes may get the fallen pillow or blankets wet or dirty. This, in turn, adds to the laundry work of the parents, which work is often difficult to arrange to do on a trip or a vacation.

Another problem experienced from time to time on long car trips by many parents of small children is the bickering or arguments between the children. For example, an older child may be trying to concentrate on a puzzle on the right side of the backseat, while a bored younger child on the left side of the backseat is intent, due to his boredom, on bothering the peaceful older child. Any device which might tend to diminish the ability of one child in a backseat from bothering, hitting or otherwise interfering with another child in the backseat would be greatly welcomed by such parents.

In light of the foregoing problems, it is a principal object of the present invention to provide a storage container apparatus for use by two children in a backseat of an automotive vehicle to store items useful to keep them occupied and to provide them each with pillows upon which they may rest their heads when tired.

It is a related object of the present invention to provide a support structure for pillows in such vehicles upon which the children may rest their heads that keeps the pillows in place in the car so as to not allow the pillows to be accidentally dropped out of the car or into the floor area adjacent the backseat.

It is another object of the present invention to provide a storage container which can be secured by a seat belt in the center of a bench-type backseat of an automobile, so that it will not move about when the car travels over road bumps or is turning.

Another object of the present invention is to provide at least two separate storage compartments for each child, so as to help minimize disputes between the children over such items.

It is a related object of the present invention to provide a storage apparatus which is lightweight and easily portable by an adult by one hand so as to facilitate the loading and unloading of the apparatus outside of a vehicle.

SUMMARY OF THE INVENTION

In light of the foregoing problems and objects, there is provided in accordance to a first aspect of the present invention, a portable storage container apparatus for the backseat of an automotive vehicle for simultaneous use by two children. The apparatus comprises cushion means and a housing having four vertical outer wall sections, a vertical central wall section, a floor section and left and right roof sections. The cushion means includes left and right cushions respectively supported, at least in part by the left and right roof sections, and is for cushioning the heads of two children napping in the backseat of the automotive vehicle on either side of the apparatus. The vertical outer wall sections are preferably arranged to form a rectangular box with a substantially open top. The outer wall sections define front, rear, left side and right side outer walls of the housing. The left and right side wall sections are substantially identical in shape and have a rectangular configuration. The front and rear wall sections are substantially identical in overall shape and each have a pentagonal configuration symmetrical about a vertical axis. The vertical central wall section extends horizontally between the central vertical axis of the front and rear wall sections of the housing, and it divides the housing into left and right storage compartments. The left and right roof sections are arranged to pivot relative to the remainder of the housing to provide access to the storage compartments within the housing.

The cushion means preferably includes two pillows which serve as the left and right cushions, and flexible case means having two internal compartments for holding both pillows in place on the apparatus. The cushion means also preferably includes quick release means for removably attaching the flexible case means to the roof sections of the housing, such as two sets of Velcro fasteners. The roof sections preferably pivot on account of being hinged along high portions of the roof line. Internal dividers may be provided within the individual storage compartments of the housing. Pouch means for storing small objects may be provided on the removable divider members.

The storage container apparatus preferably also includes handle means for carrying the apparatus. It also preferably includes means for retaining a seat belt of the backseat of the vehicle in a predetermined location on the housing, so that when the seat belt is fastened, the apparatus is maintained securely in place relative to the backseat.

Finally, the storage container apparatus preferably includes means for spacing the rear wall section of the housing away from the back rest portion of the backseat, so that the back rest will not interfere with pivotal movement of the left and right roof sections of the housing.

The foregoing description summarizes the first aspect or preferred embodiment of the present invention. However, as will be appreciated, the design and construction of the apparatus can be varied in a number of ways. Accordingly, it is appropriate to summarize the invention in the following more general manner.

According to a second, more general aspect of the present invention, there is provided a hand-portable lightweight storage apparatus for use by one or two persons in the backseat of an automotive vehicle. The apparatus comprises a housing having a floor structure, a roof structure, and an outer wall structure; and means, supported, at least in part by the roof structure, for cushioning heads of persons in the backseat of the automotive vehicle on either side of the apparatus and resting, at least in part, against the apparatus. The outer wall structure includes at least one outer wall section, which may have a rectangular, hexagonal, oval or other horizontal cross-section. The housing is preferably symmetrical about a central axis, which axis may extend from front to rear or from side to side. The roof structure has at least one high portion located above the central axis. The roof structure is also arranged to slope generally downwardly from such high portion, thereby providing left and right inclined roof sections. Such roof sections may be flat or curved. The outer wall structure may have closed or opened front and rear walls and side walls. The means for cushioning preferably includes removable cushions. However, if desired, the cushions may be made permanently attached to the roof structure and even made part thereof.

These and other objects, advantages and aspects of the present invention may be further understood by referring to the detailed description, accompanying Figures, and appended claims.

BRIEF DESCRIPTION OF THE DRAWINGS

The drawings form an integral part of the description of the preferred embodiment and are to be read in conjunction therewith. Like reference numerals designate the same or similar components or features in the various Figures, where.

DETAILED DESCRIPTION OF THE PREFERRED EMBODIMENTS

Figure 1:
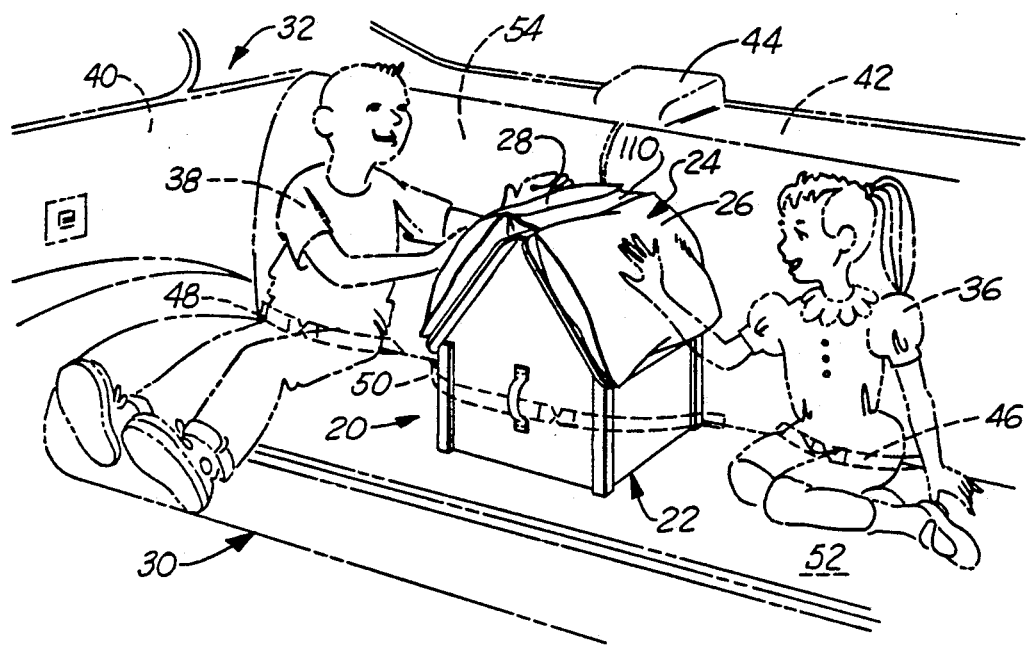
FIG. 1 is an upper front perspective view of the portable backseat storage container apparatus of the present invention which shows its two headrest cushions and its preferred location in the center of the backseat of an automobile between two children who will use same.
Figure 2:
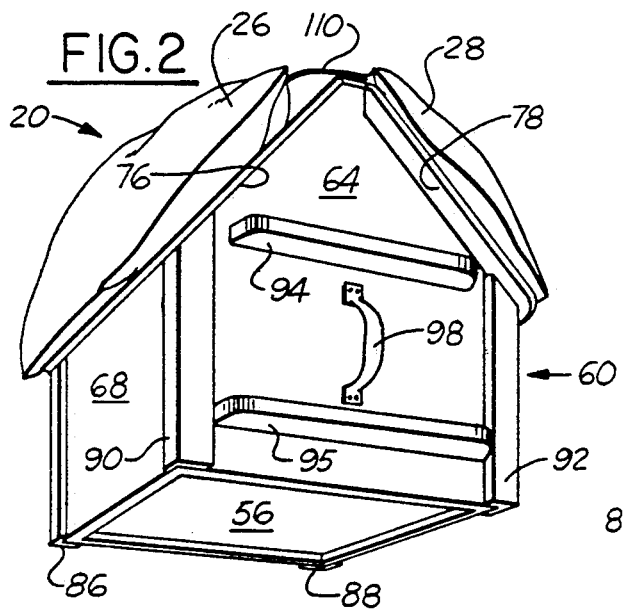
FIG. 2 is a lower rear perspective view of the FIG. 1 apparatus showing its bottom and two spacer members located on the rear face of the apparatus.
Figure 3:
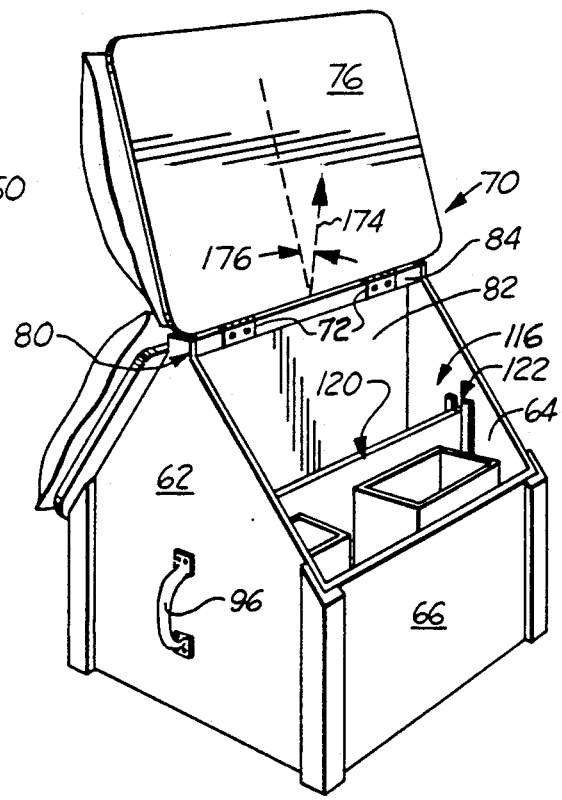
FIG. 3 is an upper front perspective view of the FIG. 1 apparatus with its left headrest cushion and cover of the apparatus in its raised position, which shows the left storage compartment therein.

FIGS. 1, 2, and 3 show the hand-portable, lightweight storage container apparatus 20 of the present invention from an upper front perspective view, a lower rear perspective view, and a front perspective view showing one-half of the interior of the apparatus. The apparatus 20 includes a housing 22 and a headrest cushion means or assembly 24 having left and right pillows 26 and 28 connected together by fabric member 110. The apparatus 20 is shown on the typical backseat 30 of an automotive vehicle such as car 32 upon which are seated two children, namely a girl 36 and a boy 38, all shown in phantom. Also shown in phantom are a portion of the back door 40, a rear window ledge or shelf 42, and center-mount brake light 44. Also, a broad dashed lines 46, 48 and 50 represent seat belts respectively passed about girl 36, boy 38, and container apparatus 20. The backseat 30 includes a bench 52 and a back rest 54.

As may be best seen in FIGS. 2 and 3, the housing 22 includes: a floor structure 56; an outer wall structure 60 formed of vertical front and rear walls 62 and 64 and vertical left and right side walls 66 and 68; and roof structure 70 including hinge means such as pair 72 of hinges pivotally attaching left roof section 76 and another pair of hinges (see FIGS. 5 and 6) pivotally attaching right roof section 78 to the top portion 80 of the housing, which also forms part of the roof structure. The housing 22 also includes a vertically arranged central interior wall section 82 that includes a horizontal roof support member or portion 84 extending along and forming the high line or top portion 80 of roof structure 70 between the apexes of front and rear vertical wall sections 62 and 64. Member 84 is preferably thick enough to provide additional strength and reinforcement for the high line of roof structure 70. Corner moldings 86, 88, 90 and 92 are respectively located in the left front, right front, left rear, and right rear corners of the outer wall structure 60 to provide a more interesting appearance. However, such corner moldings may be omitted if desired.

Horizontally arranged elongated spacer members 94 and 95 on rear wall section 64 provide a means for spacing the rear wall section of the housing away from the back rest 54 of the backseat 30. The vertically arranged carrying handles 96 and 98 respectively located on the front and rear wall sections 62 and 64 provide a convenient means for carrying the apparatus 20. As shown in FIG. 1, the center seat belt 50 can be passed through the handle 96, then tightened up to hold the housing 20 securely in place on the backseat 30, so that it will not move out of position when the car 32 drives over rough roads or makes quick turns. The handles 96 and 98 may be made of metal or high-strength plastic and fastened on with screws, adhesive epoxy, or other conventional techniques.

As best shown in FIG. 1 and 2, the headrest cushion assembly 24 is preferably made from two pillows 26 and 28 which are interconnected by a piece or web of fabric 110 that is stitched to the casings of pillows 26 and 28 along the top edge thereof, as best seen in FIG. 1.

Figure 6:
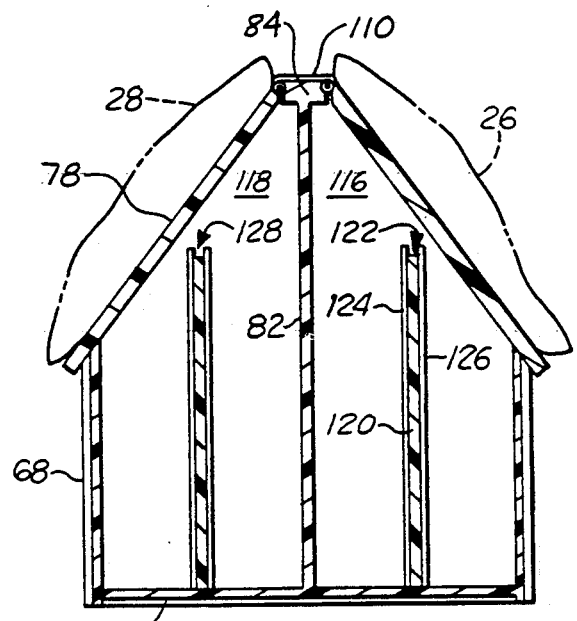
FIG. 6 is cross-sectional view of the FIG. 1 apparatus taken along lines 6—6 of FIG. 5 showing the location of the removable dividers used in the left and right storage compartments.

FIG. 3 shows that the central vertical wall 82 divides the interior storage space within the housing 22 into two separate storage compartments, namely left compartment 116 and right compartment 118 which can be seen in FIG. 6. FIG. 3 also shows a divider structure 120, which is removably held by vertical guide tracks on the inside surfaces of front and rear vertical walls 62 and 64. A guide track 122 formed on the inside surface of wall 64 is typical and includes two ridges of material which project slightly outwardly from the face of wall 64. These ridges of material 124 and 126 may be seen in FIG. 6. A similar vertical guide track 128 is spaced and formed on the inside surface of wall 64 in the right compartment 118, as best shown in FIG. 6. Two similar vertical guide tracks are formed on the inside surface of vertical wall 64 (as may be seen in FIG. 7).

Figure 4:
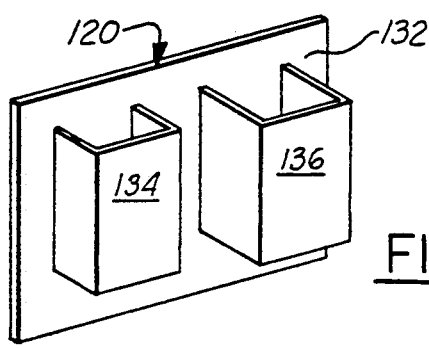
FIG. 4 is a perspective view of the removable storage divider used within the left storage compartment.

FIG. 4 shows one possible construction for the divider 120, which may consist of a rectangular planar board 132 to which is attached to pockets or pouches 134 and 136. These pouches may be integrally formed with or may be bonded by suitable adhesive or otherwise fastened to the board 132. Similarly, the ridges used to form the guide tracks may be integrally formed with or may be separately fastened to the printed rear vertical walls 62 and 64.

Figure 5:
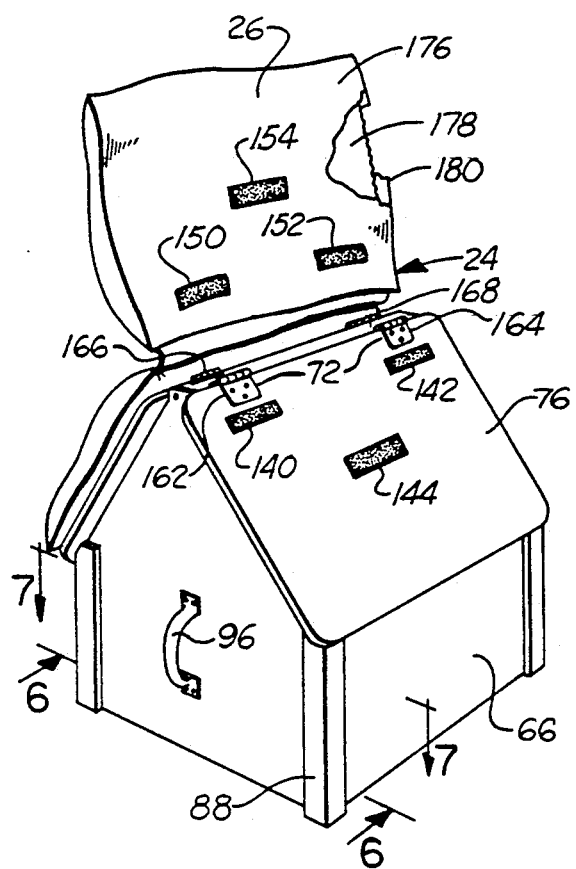
FIG. 5 is an upper front perspective view of FIG. 1 apparatus showing the left headrest cushion removed from its normal resting position on the cover for the left storage compartment.

FIG. 5 shows that the headrest cushion assembly 24 may be constructed to be detachable from the left and right roof sections 76 and 78. In the preferred embodiment of the present invention, the two pillow sections 26 and 28 each include a plurality of barb and loop fasteners such as the familiar Velcro fasteners widely used on garments, knapsacks, and the like. Specifically, strips 140. 142 and 144 are of one type of material, such as the barb material, and are provided on the inclined outer surface of roof section 76 while corresponding strips 150, 152 and 154 of the other type of material such as the loop material, are located in mating relationship on the underside of the casing of cushion 26, as shown. Thus, when the cushion 26 is laid on top of roof section 76, the two are firmly fastened together, and will not come apart except by deliberately pulling them apart Velcro fastening means are also provided in the same manner on the exterior surface of roof section 78 and the underside of the casing of cushion 28. Those in the art will appreciate that once fastened, either roof section 76 or 78 may be swung entirely open while still not allowing the attached cushion to fall off. It should also be appreciated that a different number or configuration of barb and loop fasteners may be utilized.

In FIG. 5, two pairs of hinges are shown, one for each roof section. The hinges 162 and 164 form hinge pair 72 and support left roof section 76, and are attached to the face of central horizontal support portion 84 and to the exterior surface of left roof section 76. (Note that the hinges may be hidden by attaching them to the inside of the roof sections, if desired, for a better appearance. Also a continuous hinge may be used in place of each pair of hinges.) Hinges 166 and 168 pivotally support roof section 78, and are attached to the opposite face of horizontal support member 84. FIGS. 3 and 5 illustrate the advantage of using hinges at the top of the roof sections 76 and 78. Specifically, such a location for the hinge means ensures that the forces of gravity will tend to keep roof sections 76 and 78 in their normal position, i e., down, during traveling. However, as shown in FIG. 3, this location for the hinges 162, 164. 166 and 168 also enables gravity to be used to keep a roof section, such as section 76 in its fully raised or opened position, since the location of the hinges allows the center of gravity of the roof section to be swung well over the axis of rotation of the hinges. As shown in FIG. 3, once the roof section 76 is rotated past the vertical arrow 174, gravity acts to keep the roof section in its fully opened position. The angle 176 of opening past the imaginary vertical line 174 may be controlled as desired by the thickness of the cushion 28, the design of the hinges, 162 and 164 or by a stop (not shown) to limit travel.

FIG. 5 also shows that the pillows, such as pillow 26, of headrest cushion assembly 24 may consist of a casing 176 as well as an internal pillow 178 made of any suitable or conventional pillow material. If desired, a zipper or snaps may be provided along one of the edges such as the edge 180 to allow the interior pillow member 178 to be removed.

Figure 7:
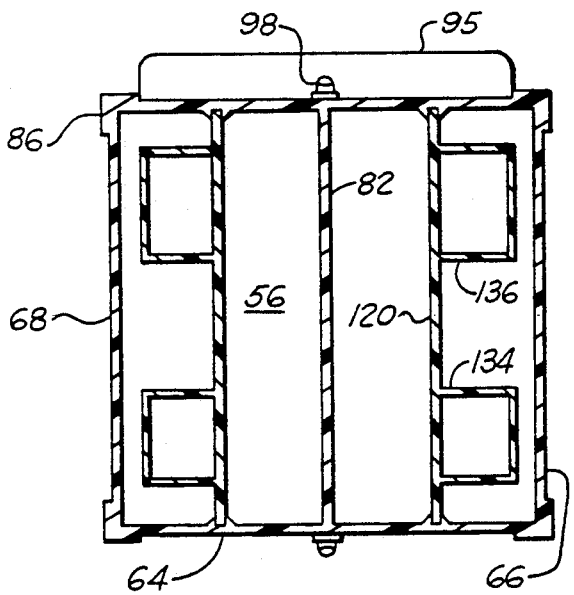
FIG. 7 is cross-sectional view of the FIG. 1 apparatus taken along line 7—7 of FIG. 5 showing the interior lay-out of the storage compartments of the apparatus.

FIGS. 6 and 7 show the interior layout of the housing 22 in cross-sectional views respectively taken along line 6—6 and line 7—7 of FIG. 5. Although the dividers 122 and 128 are shown dividing the compartments 116 and 118 roughly in half, it will be appreciated that the dividers may be placed in different locations. Also, transverse dividers, rather than longitudinal dividers may be provided by simply forming the necessary guide tracks along left and right vertical wall sections 66 and 68 and central wall section 82. Also, it should be appreciated that the pockets or pouches on the dividers may be located in different places or may be omitted entirely.

The choice of materials used to make the various components of the container apparatus of the present invention is a matter of aesthetics, economics and desired functionality. Preferred materials for making the apparatus 20 are light-weight, high-strength, impact-resistant conventional plastic materials such as high-impact polystyrene, butyrate plastic materials or other high-impact thermosetting plastic resins commonly used in infant car seats, large plastic riding toys or all-plastic cooling containers used by people who are camping or on picnics. While injection-molded or blow-molded plastic material is presently perceived as the most economical way to manufacture the housing, other materials, such as wood or metal, may also be used if desired. As a matter of economics, it is preferred to make the entire structure with a minimum number of separate components in order to reduce assembly costs. However, separately assembled components can be utilized if desired to construct the overall housing and internal dividers used therein. Similarly, the pillow material may be alternatively be made of spongy foam rubber, or of down feathers or synthetic padding or stuffing material used in conventional pillows. The pillow casing material alternatively may be made of the synthetic material of the type used in automotive seat coverings including synthetic velours synthetic woven material or vinyl sheeting, or other conventional fabrics such as cotton, wool or conventional synthetic fibers such as polyester.

The internal organization of the housing may be varied considerably. For example, one single large compartment may be utilized, rather than two completely separate left and right compartments, by substantially eliminating the vertical central wall section, except for the central roof support portion thereof, which is preferably retained for increased strength and rigidity of the overall housing. Also the removable dividers may be arranged perpendicularly to the arrangement shown in the Figures. Also, more dividers may be provided and can be made non-removable, if desired. Also, different types of zippered pouches, boxes, cups or other holders may be provided as organizing aids to help the children or parents using the container apparatus to organize their belongings stored inside any way they wish.

The preferred range of dimensions for the container apparatus is about: 12 to 16 inches wide; 14 to 18 inches high at the highest edge of the roof line, and 7 to 11 inches high at the lowest edge of the roof line; and 13 to 17.5 inches deep overall, with the depth of the spacer members being 1.5 to 2.5 inches. A preferred range of angles of inclination for the inclined roof is about 30 degrees to about 60 degrees with 40 to 50 degrees being most preferred. When constructed with the foregoing exemplary ranges of dimensions, the container apparatus is thus small enough to fit nicely in the center position of a bench-type backseat of a car. For ease of carrying the container apparatus should be under 15 pounds, and is preferably lightweight, that is, under about 10 pounds when empty, and more preferably under about 7.5 pounds when empty.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. The following variations in design and/or construction could be made and are presented here, as illustrations of, rather than the outer limitations of, possible variations in the presently preferred design of the present invention shown in the Figures.

The shape of the housing may be varied. For example, the horizontal cross-sectional shape could be triangular, pentagonal, hexagonal, octagonal, oval or cylindrical, rather than rectangular. Also, different handle arrangements for carrying the apparatus may be utilized. One possible handle variation is to put a collapsible handle in the top center of the roof line, so that apparatus could be carried with one hand by an adult without spilling its contents. The pillow case assembly could be provided with a central hole to allow access to such a handle.

One more variation in design is to have the inclined roof sections be curved rather than flat. The curves could be concave or convex. In one concave curve design, for example, each roof section, as well as the pillow placed over it if desired, could be slightly curved inwardly and downwardly from its front and rear edges so that even a very firm pillow would tend to cradle the head of a child resting thereon. A convex curve design for the inclined roof section and/or the pillows could be utilized to provide the appearance of a roof to the housing that is more rounded to have a cloud-like or mushroom-like appearance.

Another variation in design is to provide roof sections that are detachable, but I do not prefer this since children are known for losing or misplacing things. Another design variation is to locate the hinges for the roof sections along the lower edges or inclined edges of the roof lines of the housing. However, the roof section attachment design shown in the Figures is preferred since it takes advantage of gravity to help keep such roof sections closed when they are in their normally closed position.

Yet another variation in the design of the apparatus is to allow access to the storage space of the housing principally or exclusively through the front wall and/or side wall sections, which could be made partially open. and/or have hinged covers, and/or have pull-out drawers. In such a design, the left and right inclined roof sections could be permanently attached to the housing, if desired. Alternatively, the roof sections could still be hinged or could be detachable, if desired.

The pillow case assembly could be eliminated if desired by using individual pillows or headrest cushions with snaps, Velcro fasteners or other suitable retaining means directly attached to them, to allow them to be fastened directly to their respective roof sections. Alternatively, a relatively thick form-fitting foldable pad custom-made to be fitted over the roof sections of the container apparatus like a slip cover or a fitted sheet on a mattress could be utilized. This would eliminate the need for snaps or other fasteners.

Other seat belt retaining arrangements could be utilized, like a plurality of loops or guides through which the belt is passed. Such loops could, if desired, be located on the rear wall section or side wall sections of the housing rather than the front wall section, although the last-mentioned location is preferred.

Although the container apparatus of the present invention is designed for simultaneous use by two children, it clearly may also be used by one child, or even by an adult resting one or both arms and possibly his or her head thereon. Other variations in use, design and construction of the container apparatus will no doubt occur to those skilled in the art upon contemplating my preferred design and the variations in design and construction discussed above. Accordingly, it is to be understood that the protection sought and to be afforded hereby should be deemed to extend to the subject matter defined by the appended claims, including all fair equivalents thereof.

I claim:

1. A portable storage container apparatus for the backseat of an automotive vehicle for simultaneous use by two children, comprising:

a housing having four vertical outer wall sections, a vertical central wall section, a floor section, and left and right roof sections, the floor section and vertical outer wall sections being arranged to form a rectangular box with a substantially open top, with the outer wall sections defining front, rear, left side and right side outer walls of the housing, the left and right side wall sections being substantially identical in overall shape and having a generally rectangular configuration, the front and rear wall sections being substantially identical in overall shape and each having a generally pentagonal configuration symmetrical about a central vertical axis thereof, and the vertical central wall section extending horizontally between the central vertical axes of the front and rear wall sections of the housing and dividing the housing into left and right storage compartments, the left and right roof sections being arranged to pivot independently relative to one another and to the remainder of the housing such that access to the storage compartments within the housing is provided; and cushion means, including left and right cushions respectively supported at least in part by the left and right roof sections, for cushioning the heads of two children napping in the backseat of the automotive vehicle on either side of the apparatus.

2. A storage container apparatus as in claim 1 wherein the left and right cushions of the cushion means are pillows and the cushion means includes flexible case means for holding the pillows in place on the apparatus.

3. A storage container apparatus as in claim 2, wherein the flexible case means includes left and right compartments in which the left and right pillows are respectively disposed.

4. A storage container apparatus as in claim 2 wherein the cushion means includes quick release means for removably attaching the flexible case means to the left and right roof sections.

5. A storage container apparatus as in claim 1, wherein:
the housing includes hinge means for pivotally supporting the left and right roof sections.

6. A storage container apparatus as in claim 5, wherein:
the vertical central wall section of the housing includes left and right faces and a horizontal roof portion extending over the left and right faces of the central wall section, and
the hinge means are attached to the horizontal roof portion.

7. A storage container apparatus as in claim 1, further comprising:
means for spacing the rear wall section of the housing away from a backrest portion of the backseat of the automotive vehicle to prevent the backrest portion of the backseat from interfering with the pivotal movement of the left or right roof sections of the housing.

8. A storage container apparatus as in claim 7 wherein:
the rear wall section of the housing has a substantially planar exterior surface, and
the means for spacing includes at least two horizontally arranged elongated spacer members of predetermined width projecting from the exterior surface of the rear wall section to provide clearance between the backrest portion of the backseat and the rear wall section.

9. A storage container apparatus as in claim 1, further comprising:
means for dividing the left compartment into at least two storage spaces, and
means for dividing the right compartment into at least two storage spaces.

10. A storage container apparatus as in claim 9 wherein:
the rear wall section of the housing has formed on an interior side thereof left and right vertical guide tracks spaced from and parallel to one another and respectively located in the left and right compartments of the housing;
the front wall section of the housing has formed on an interior side thereof left and right vertical guide tracks spaced from and parallel to one another and respectively located in the left and right compartments of the housing;
the means for dividing the left compartment includes a planar vertically arranged wall section having a front and rear end portions respectively removably held by the left guide tracks of the front and rear wall sections; and the means for dividing the right compartment includes a planar vertically arranged wall section having a front and rear end portions respectively removably held by the right guide tracks of the front and rear wall sections.

11. A storage container apparatus as in claim 9, wherein:
the means for dividing the left compartment includes at least one substantially planar wall and at least one pouch means extending outwardly therefrom for storing small objects, and
the means for dividing the right compartment includes at least one substantially planar wall and at least one pouch means extending outwardly therefrom for storing small objects.

12. A storage container apparatus as in claim 1, further comprising:
means for retaining a seat belt of the backseat of the vehicle in a predetermined location adjacent the housing such that when the seat belt is fastened, the apparatus is maintained securely in place on the backseat.

13. A storage container apparatus as in claim 1, further comprising:
handle means, including at least one handle attached to the housing, for carrying the apparatus.

14. A storage container apparatus as in claim 13, wherein:
the handle means includes front and rear handles respectively extending outwardly from exterior surfaces of the front and rear vertical wall sections.

15. A hand-portable lightweight storage apparatus for use in the backseat of an automotive vehicle by children, comprising:
a housing having at least one outer wall section, a floor section and left and right roof sections pivotally mounted to said housing, the housing being sized and adapted to fit in a central location of the backseat with the roof sections pivoting in a direction parallel to the longitudinal length of the backseat,
the floor section and outer wall section being arranged to form a storage container with a substantially open top which is normally covered by the left and right roof sections, the left and right roof sections being arranged to pivot independently of one another and to pivot relative to the remainder of the housing to provide access to storage space within the storage container of the housing;
means, supported at least in part by the left and right roof sections, for cushioning heads of children who are seated in the backseat of the automotive vehicle on either side of the apparatus and are resting their heads at lest in part against the apparatus; and
means on the housing for receiving a seat belt such that the housing is securable by the seat belt so as to remain in a central location on the backseat.

16. A storage apparatus as in claim 15, wherein:
the means for cushioning includes left and right pillows respectively normally bearing at least in part against left and right roof sections.

17. A storage apparatus as in claim 15, wherein:
the housing is configured to have and to be symmetrical about a longitudinal axis extending from a front part of the housing to a rear part of the housing,
the front and rear parts of the housing constitute part of the outer wall section and respectively include with a front wall portion and a rear wall portion, with each such wall portion rising to a respective peak which is generally located in a vertical plane containing the longitudinal axis, and the housing has a central wall portion extending between and connected to the front and rear wall portions which provides increased rigidity to the housing along the longitudinal axis of the housing.

18. A hand-portable lightweight storage apparatus for use by one or two persons in the backseat of an automotive vehicle, comprising:

a housing having a floor structure, a roof structure, and an outer wall structure including at least front and rear wall sections which are substantially symmetrical about a central axis of the housing extending therebetween, the floor structure and outer wall structure being configured to form an internal storage space within the housing that is accessible to persons using the storage apparatus in the backseat of the vehicle, the roof structure having at least one high portion located generally above the central axis and two inclined sections normally arranged to slop generally downwardly from such high portion, thereby providing left and right normally inclined roof sections, the two inclined roof sections being arranged to pivot independently of one another and to pivot relative to the remainder of the housing; and means, supported at least in part by the roof structure, for cushioning heads of persons in the backseat of the automotive vehicle on either side of the apparatus and resting at least in part against the apparatus.

19. A storage apparatus as in claim 18, wherein:

the housing is generally rectangular in horizontal cross-section, and the high portion of the roof structure is rigidly attached to the housing and includes an elongated exterior surface which extends generally parallel to and is located directly above the central axis of the housing.

20. A storage apparatus as in claim 18, wherein:

the housing is generally rectangular in horizontal cross-section, and the high portion of the roof structure is rigidly attached to the housing and including an elongated exterior surface which extends generally parallel to and directly above the central axis of the housing.

21. A storage apparatus as in claim 18, wherein:

the means for cushioning includes a plurality of headrest cushions which are detachable from the housing.

22. A storage apparatus as in claim 18, further comprising:

means for retaining a seat belt of the backseat of an automotive vehicle in a predetermined location adjacent to the housing when such seat belt is fastened, whereby the apparatus may be maintained securely in place on the backseat.

23. A storage apparatus as in claim 18, further comprising:

handle means, including at least one handle attached to the housing, for carrying the apparatus.

24. A storage apparatus as in claim 18, further comprising:

means for spacing the housing away from a back rest portion of the backseat of an automotive vehicle to prevent the back rest portion of the seat from interfering with pivotal movement of the left or right roof sections of the housing.

25. A storage apparatus as in claim 18, further comprising:

quick release means for removably attaching the means for cushioning to the housing;

means for spacing a rearwardly facing portion of the housing away from a back rest portion of the backseat of an automotive vehicle to prevent the back rest portion of the backseat from interfering with pivotal movement of the right or left roof section of the housing; and means for retaining a seat belt of the backseat of the vehicle in a location adjacent to the housing when the seat belt is tightened about the housing, such that the apparatus is maintained securely in place on the backseat of an automotive vehicle.

26. A hand-portable lightweight storage apparatus for use by one or two persons in the backseat of an automotive vehicle, comprising:

a housing having a floor structure, a roof structure, and an outer wall structure including at least left and right wall sections which are substantially symmetrically arranged about a transverse central axis of the housing extending between the left and right wall sections, the floor structure and outer wall structure being configured to form an internal storage space within the housing that is accessible to persons using the storage apparatus in the backseat of the vehicle, the roof structure having at least one high portion and left and right roof sections which are arranged to slop generally downwardly from such high portion toward the left and right wall sections, thereby providing left and right generally inclined roof sections, the roof sections being pivotally mounted to the housing in a manner which allows each roof section to be pivoted independently of the other roof section; and means, supported at least in part by the roof structure, for cushioning heads of persons who are seated in the backseat of the automotive vehicle on either side of the apparatus and are resting their heads at least in part against the apparatus.

27. A storage apparatus as in claim 26, wherein:

the housing is generally rectangular in horizontal cross-section, and the high portion of the roof structure includes an elongated surface which extends generally perpendicularly to and above the transverse central axis of the housing.

28. A storage apparatus as in claim 27, wherein:

the left and right roof sections are pivotally attached to the high portion of the roof structure.

29. A storage apparatus as in claim 26, wherein:

the means for cushioning includes a plurality of headrest cushions which are detachable from the housing.

* * * * *

UNITED STATES PATENT AND TRADEMARK OFFICE
CERTIFICATE OF CORRECTION

PATENT NO. : 5,007,569
DATED : Apr. 16, 1991
INVENTOR(S) : Yoram Guy

It is certified that error appears in the above-identified patent and that said Letters Patent is hereby corrected as shown below:

ON THE TITLE PAGE:

Abstract, Line 15, after "electrical" insert --coil--;

Col. 9, Line 43, Claim 11, "direction" should be --and--;

Col. 10, Line 60, Claim 25, "t" should be --to--.

Signed and Sealed this

Fifteenth Day of December, 1992

Attest:

DOUGLAS B. COMER

Attesting Officer

Acting Commissioner of Patents and Trademarks